July 4, 1961     Z. D. RUBEN     2,990,859
PORTABLE TABLE SAW

Filed Dec. 24, 1957                    3 Sheets—Sheet 1

Inventor,

July 4, 1961
Z. D. RUBEN
2,990,859
PORTABLE TABLE SAW
Filed Dec. 24, 1957
3 Sheets-Sheet 2
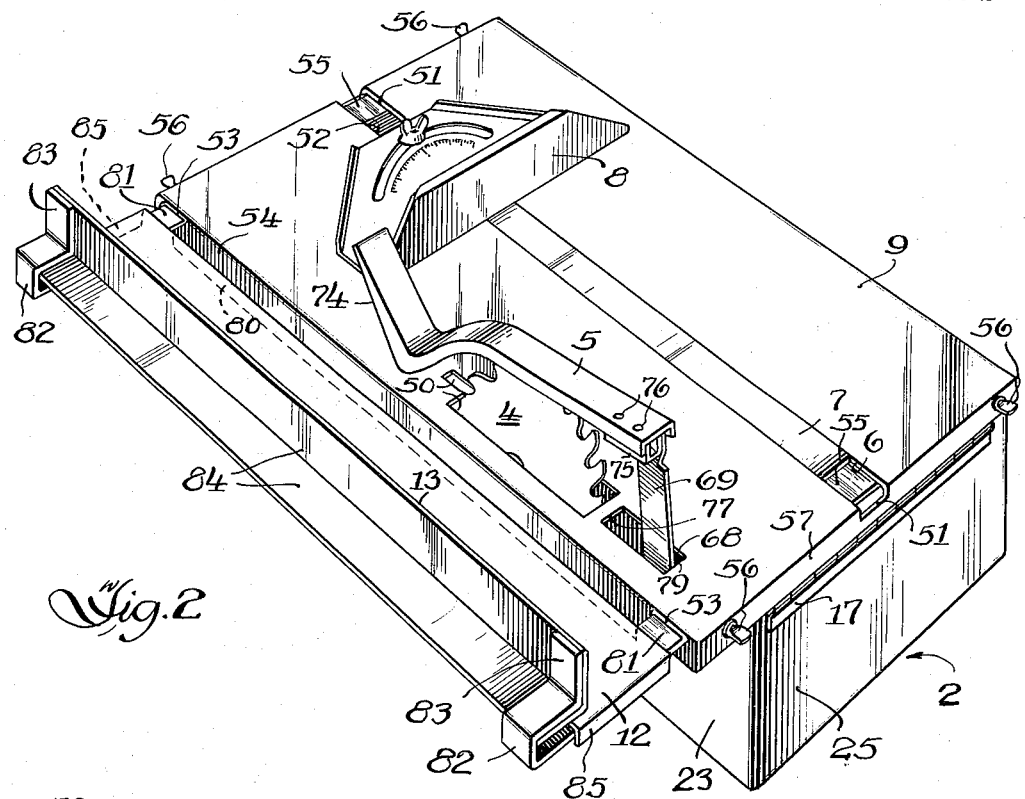
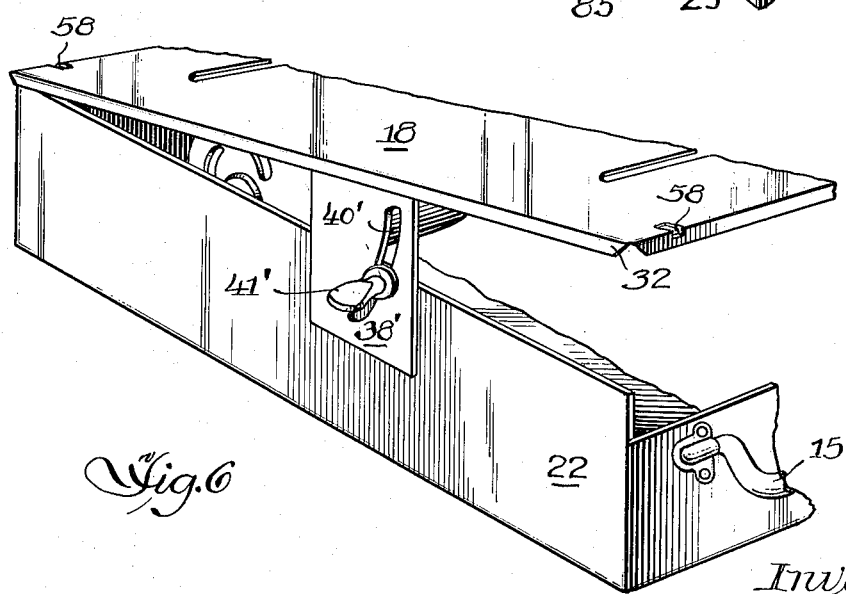
Inventor

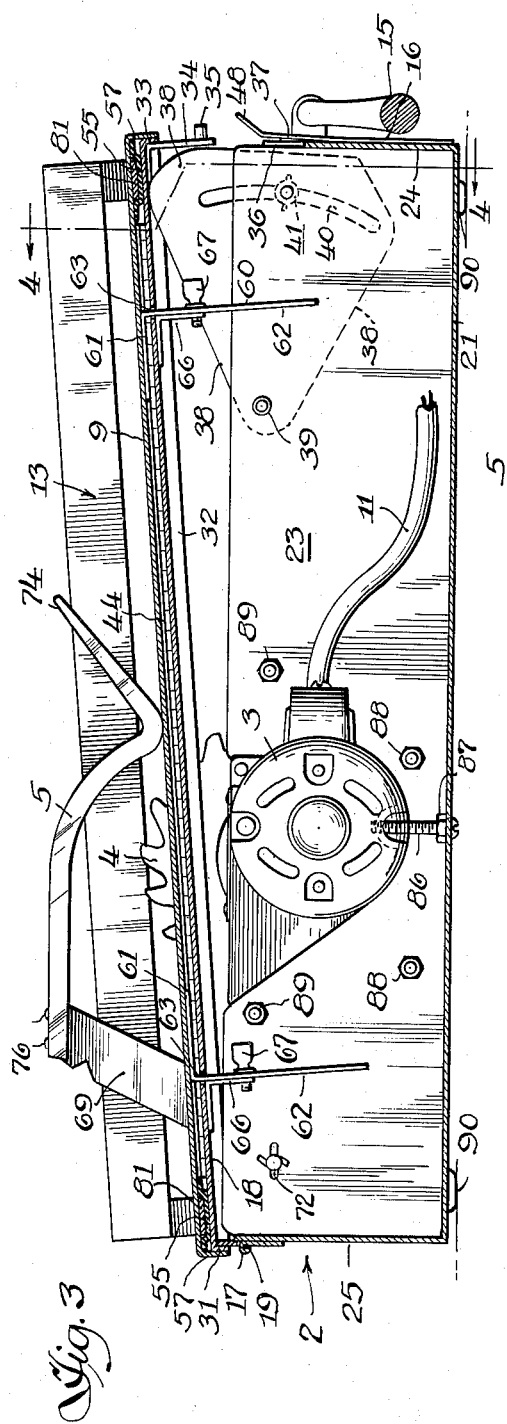
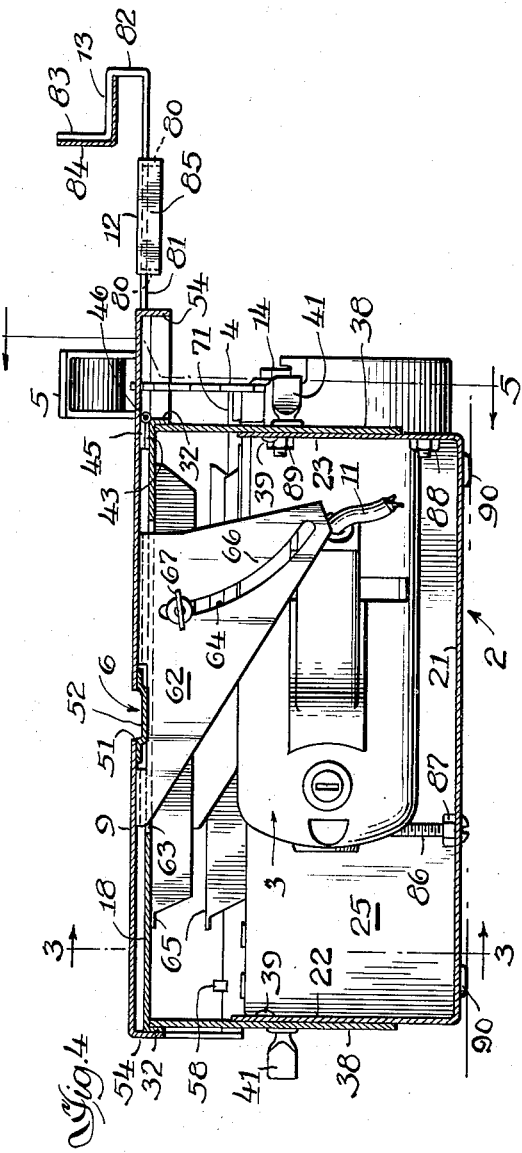

United States Patent Office 2,990,859
Patented July 4, 1961

2,990,859
PORTABLE TABLE SAW
Zorro D. Ruben, Elmhurst, Ill.
(336 N. Central Ave., Chicago 44, Ill.)
Filed Dec. 24, 1957, Ser. No. 704,918
6 Claims. (Cl. 143—132)

The present invention relates to motor driven tools of the type used for cutting, sawing and grinding, wherein the tool is usually stationary rather than hand-held while in operation. This application is a continuation in part of my co-pending application, Serial Number 526,504, filed August 4, 1955.

It is an object of this invention to provide a motor driven tool of the aforesaid type capable of performing more readily a larger number of accurate cutting operations, providing dimensional capacity for ample power and yet being so compact and light in weight that it may be carried about easily by a single person.

It is a further object of this invention to provide a tool of the above described character which does not require diassembly of any major parts for transportation after use or reassembly for use after transportation.

It is also an object of this invention to provide a tool of this character with a simple and rapid means of adjustment of the angle of inclination of the side face of a cutting blade mounted on the tool's power shaft with the major work surface of the material being cut, coupled with a simple and rapid means of adjustment of the height above the work support surface to which the blade projects.

It is an object of this invention to provide a table saw with a self-contained guidance member for making long cuts, known as "rip" cuts, which member can also serve to support a light weight side extension of the work table, and which can be extended a considerable distance from the cutting tool to handle wider materials.

A further object of this invention is to extend the teaching of the aforementioned patent application Serial No. 526,504 to additionally provide increased rigidity of the material guiding parts with respect to the cutting tools employed—without also substantially increasing the weight of these parts.

Another object of this invention is to provide a guard which need not be disassembled and replaced frequently during operation of the tool whenever access might be required to the storage box for accessories or to the blade arbor for blade changes.

Other objects, advantages and features of the invention will become apparent upon making reference to the specification to follow taken in conjunction with the drawings wherein:

FIG. 2 is a perspective view of the same tool taken from the opposite end, said tool now having its rip fence and table extension plate in position therein and thereon respectively, its cover dropped to a position providing maximum depth of cut and its work table in a position providing a 90° angle between the table surface and the side surface of the blade;

FIG. 3 is a longitudinal vertical sectional view, with its cover partially raised, taken along the line 3—3 of FIG. 4;

FIG. 4 is a transverse vertical sectional view of the tool as set up in FIG. 3 taken along the line 4—4 of FIG. 3;

FIG. 6 (Sheet 2) is a fragmentary longitudinal side elevation of the tool showing a modification of the means providing depth of cut adjustment.

Figure 1:
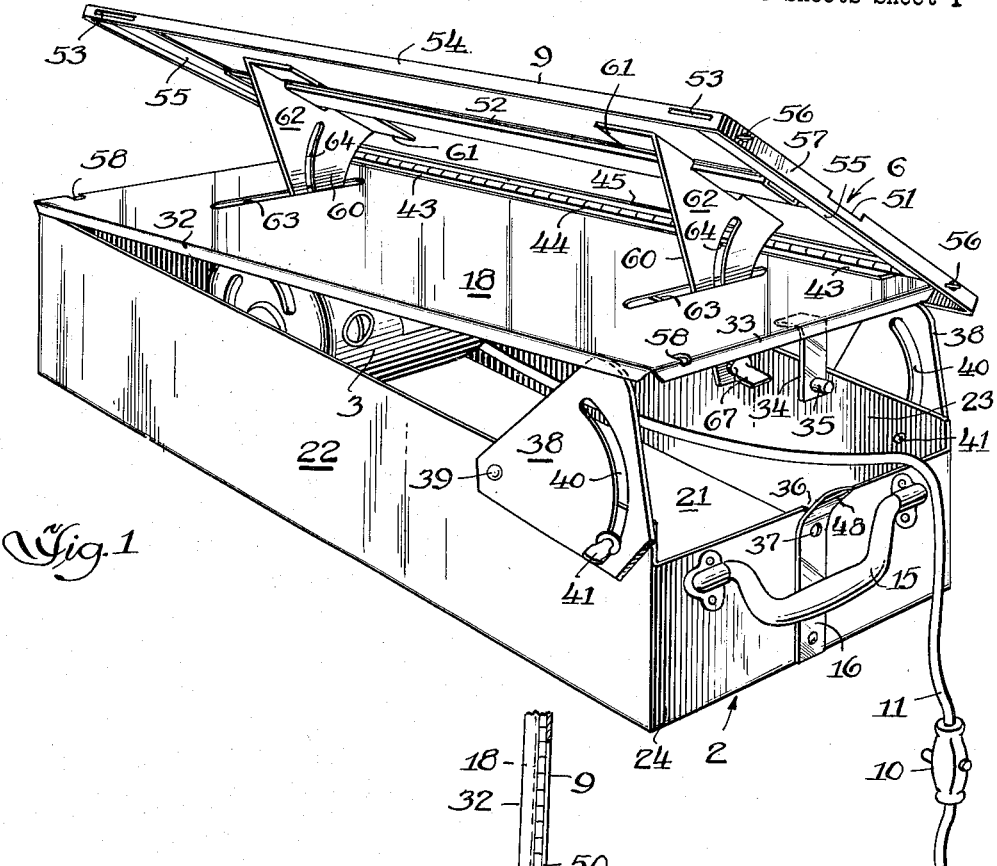
FIG. 1 is a perspective view of an embodiment of the invention showing same with its cover lifted for reduced depth of cut and its work table tilted for a bevel cut.

The present invention provides, in portable form, what is commonly recognized as a complete bench or table saw with a self contained power unit capable of setting up rapidly for cross cutting, face mitering, bevel cutting, ripping, and grooving operations to variable depths, by accurately guiding materials across its cutting blade.

Reference should now be made to the drawings where the same reference characters indicate the same elements throughout.

In the form of the invention illustrated, the components making up the portable table saw assembly include a portable storage box or carrying case 2, a motor 3 mounted within the box, a rotary saw blade 4 secured to the motor shaft outside of the box, a tool guard 5, a sliding bar 7 (FIGURE 2), carrying a protractor type material guide 8, slidably mounted in a slot 6 formed in the work table 9 of the tool case 2. The energization of the motor 3 may be controlled by a switch 10 attached to an electric power cable 11. A table extension plate 12 (FIGURES 2 and 4) rests on a rip fence 13 attached to the work table 9. A carrying handle 15 is most conveniently attached to the front wall 24 of the box.

All parts which may be disassembled from the case, except the rip fence 13 which is recessable in the work table, are of a size designed to fit within the storage box case when not in use.

A detailed construction of the various components above mentioned and their operation will now be described, one at a time.

*The storage box*

The box or case includes an open-top, rectangular body having a bottom 21, an unobstructed longitudinal wall 22, a cut out longitudinal wall 23 to which the motor 3 is attached and through which a blade supporting shaft 14 projects, a front end wall 24 having a handle 15 and a leaf spring catch 16 attached thereto, and a rear end wall 25 having one leaf of a hinge 17 attached thereto.

The top edge of the front end wall 24 is located a small distance below the top of the longitudinal walls 22—23 and the lower edges of the work table 9 to allow for passage of the electric cable 11 and ventilating air.

The box has a flat rectangular cover 18 having four short depending flanges at its edges. Attached to the rear flange 31 of the cover 18 is the other leaf of the hinge 17. The cover 18 is thus pivotally attached to the box 2 by a hinge pin 19 in the hinge 17.

The leaves of the hinge 17 may be attached to the box and cover by riveting or spot welding as these parts are preferably made thin and strong of sheet metal on the order of eighteen gauge in thickness.

Two narrow longitudinal flanges 32—32 depend from the cover, spaced slightly outside of the box walls 22—23, and resting on the top edges of same when the cover is in its closed position. At the front end of the cover 18, a similar depending flange 33, lined up with the front wall 24 of the box, has a small angle 34 projecting therefrom with a round pin 35 attached thereto. The front wall 24 of the box is provided with a slot or notch 36 therein which serves to guide the pin 35 which enters the notch as the cover is closed. This device serves to accurately locate the closed cover with the box so that the slot 6 in the work table 9 attached to the cover will be and remain accurately parallel to the side surface of the blade 4.

The leaf spring catch 16 is provided with an opening 37 just larger than the pin 35 and a camming nose 48 so that, when the cover 18 is being closed, the pin 35 acts first to push the spring out. Then, when the pin 35 enters the slot 36 and reaches bottom, the spring returns and the pin 35 enters the spring opening 37. To thereafter open the cover, the operator holds back the spring catch and lifts the cover. Also serving to align the cover with the box sides are two lift plates 38—38 each of which is attached to a longitudinal wall of the box. In the embodiment of the lift plates, as illustrated in FIGS. 1 through 4, each is attached to a longitudinal wall of the box by means of a working fit rivet 39—39 by means of which the lift plates can be pivotally moved up and down. The lift plates are provided with arcuate slots 40—40 with centers at the rivets through which shoulder type thumb screws 41—41 enter tapped holes in the box walls.

The plates 38—38 are of a thickness which fits just inside of the flange 32 of the cover 18 and outside of a wall 22 or 23 of the box. The cover 18 may rest on the plates 38—38 which can be locked in selected, continuously variable positions with the screws 41—41. By this means the perpendicular distance of the cover 18 from the shaft 14 can be varied to provide changes in the depth of cut as may be required.

A modification of the lift plates 38—38 is shown in FIG. 6. Here a plate 38' is attached to the inside of the flange 32 of the cover 18, as by spot welding thereto. The plate 38' is provided with an arcuate slot 40' now centered at the hinge pin 19.

A shoulder type thrumb screw 41' enters a tapped hole in the side wall of the box through the arcuate slot 40'. The modified assembly of FIG. 6 functions as before except that the box cover 18 can not be fully opened unless the thumb screws 41' are removed.

However this modification can serve as a useful adjunct to the tool in instances when it is fastened to a bench top or other type of stand by the work table 9 attached to the cover 18. In such cases the modified "lift plate" assembly permits the box to drop down and yet remain suspended from the cover 18 when the thumb screws 41' are tightened.

The cover 18 of the storage box 2 has one leaf 43 of a second hinge 44 fastened thereto as by spot welding along the corner of the flange 32 which rests on the longitudinal box wall 23. The other leaf 45 of the hinge 44 is attached to the underside of the work table 9. The hinge pin 46 of the hinge 44 is aligned parallel to the side of the blade 4 and to the center line of the slot 6 in the work table. It is also placed as conveniently close to the blade 4 as is practicable considering the maximum set of useful blade teeth and tolerance for some blade wobble.

This assembly permits the work table 9 to pivot on the box cover 18 and thereby vary the inclination of the work table with respect to the blade. The continuous hinge 44 commonly referred to as a "piano" hinge also contributes to the rigidity of the cover and table assembly.

The work table 9 is preferably formed of one sheet of metal of a width extending slightly past the flange 32 over the wall 22 of the box and extending past the flange 32 over the wall 23 of the box by a distance somewhat less than the height of the wall 23 as shown in FIGURES 2 and 4. This provides some area of table support, for the material being cut, outside of the box on the blade side thereof.

A cut out 50, in the table 9, is provided through which a blade 4 may project. A cut out 51 is provided to make a recess in the table 9 parallel to the blade 4 to guide the sliding bar 7. This cut out is completed by spot welding to the underside of the table the flanged channel 52. This provides a bottom for the sliding bar 7 and ties the cut-apart table 9 together.

The table 9 is provided with flanged edges along its four sides. Two pairs of cut outs 53 are made near the front and rear extremities of the two longitudinal flanges 54 of the table 9 to permit entry of rip fence bars 81 later described.

Spot welded to the underside of the table 9, and in line with each of the two pairs of cut outs 53, is a transverse flanged channel 55—55 similar to channel 52. This accommodates said rip fence bars 81 with a sliding fit. Where channels 55 cross channel 52 the flanges and legs of 55 are cut away to permit the sliding bar 7 to slide through the transverse channels 55.

The overall thickness of the hinge 44 in the closed position of FIGS. 2, 3 and 4 separates the lower side of the table 9 from the upper side of the cover 18 and provides a space therebetween which is utilized to accommodate the flanged channels 52 and 55. These are of a total thickness equal to the aforementioned space.

The transverse channels 55 are provided with two pairs of notches, in their flanges and legs, of a width sufficient to pass the ends of four thumb screws 56. These enter tapped holes in the front and rear flanges 57—57 of the table 9. Thumb screws 56 are used to secure, in selected positions, the bars 81 of the rip fence as described later.

Notches 58 are also provided in the corners of the cover 18 to clear the thumb screws 56.

In order to secure the table 9 to the cover 18 in any desired relative inclination from zero degrees to forty-five degrees therewith a pair of angle brackets 60—60 is secured to the underside of the table 9. The short legs 61—61 of these brackets are cut away to clear the channel 52 and contact the table 9 for spot welding. The longer legs 62—62 project through slots 63—63 in the cover and are sized to be contained within the box 2 in the closed or zero inclination angle with the cover. The legs 62—62 are arcuately slotted, the center of the arcuate slots 64—64 being located on the center of the hinge pin 46.

To the underside of the cover 18, and alongside each slot 63, an angle 65 (FIGURES 3 and 4) is spot welded or otherwise secured so that its downward projecting leg 66 will be located directly behind the downward projecting leg 62 of the bracket 60. Passing through each arcuate slot 64, and entering a tapped hole in the leg 66 of each angle 65, is a shoulder type thumb screw 67. The thumb screws 67—67 may be loosened to release the table 9 and retightened after setting the table to the desired angle, thus securing it in place to support material for a bevel cut.

Blade cover guard

The work table 9 is provided with a cut out 68 (FIGURE 2) through which a support 69 for the guard or blade cover 5 projects. The support 69 is commonly known as a splitter and is located in the extended plane of the blade 4. Material, as it is being cut, passes to either side of the splitter 69 which can guide and hold the cut open if there is any tendency in the material to close together while being cut.

Figure 5:
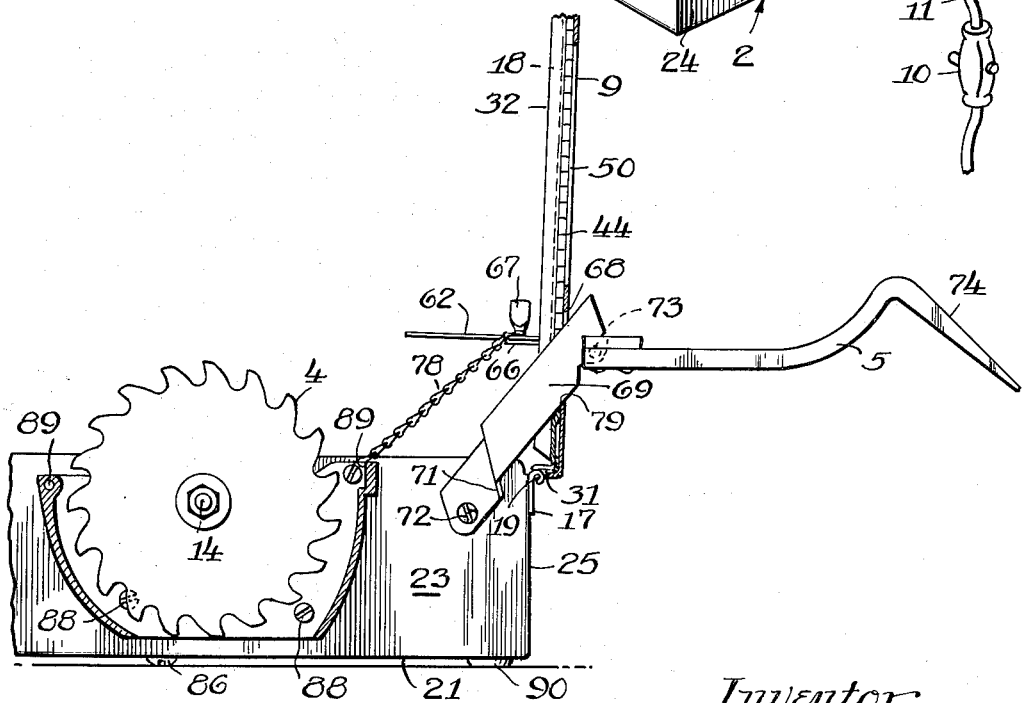
FIG. 5 (Sheet 1) is a fragmentary side view and section through the work table, showing the guard mounted on the box but displaced from its operative position by the work table in the fully open position of the box cover, taken along the line 5—5 of FIG. 4.

The splitter 69 is preferably made thin, of hard metal, and has a Z bend or offset at 71 (FIGURES 4 and 5) to reach the longitudinal box wall 23. The splitter 69 is attached to the box wall 23 by a screw passing therethru into a tapped hole in the box wall or a similar, readily assembled and disassembled, pin shaped fastener such as 72 which permits the splitter to pivot about the pin.

A screw or pin fastener 73 which secures the blade cover guard 5 to the splitter permits the guard 5 to pivot loosely on the splitter.

The guard 5 is made preferably light, of aluminum channel stock, formed to surround the upper periphery of the blade 4 and with a camming nose 74 which causes the guard to lift on the pivot 73 as material is fed to the blade.

To assemble the splitter 69 to the guard 5, a short piece of square tubing 75 (FIGURE 2) is attached to the guard 5 by screws 76—76 and the splitter is attached to the side of the tube 75 by a working fit screw or rivet 73.

Opening and closing of the cover 18 and attached work table 9, is frequently required during operation of the tool, as for example, to adjust the bevel cutting angle, to change a blade or to obtain access to parts stored within the box. The guard, once attached to the box 2 by the fastener 72, need not be removed to open or close the cover. As the cover is opened, the forward edge 77 of the table cut out 68 contacts the forward edge of the splitter and pivots it backward on the pin fastener 72 until the table and guard assembly reaches the position shown in FIG. 5. At this point a chain 78, fastened to the box 2 and the rear angle leg 66, holds the table open and prevents further backward motion.

When the cover is being closed, the rear edge 79 of the table cut out 68 presses the splitter forward up to a point and is followed by pressure of the longitudinal flange 32 of the cover 9 on the offset 71 in the splitter 69 which returns the splitter to the position of FIG. 2. The guard 5 then drops down to the table by gravity.

Rip fence and table extension

When it is necessary to make a single cut, on the order of two feet long or longer, it is desirable to guide the material against a stationary edge, commonly known as a rip fence, set up substantially parallel to the blade. This is usually a separate machine part which rests on the machine table and clamps to the front and back edges thereof in adjustable distances from the side of the blade.

The rip fence 13 provided for the tool herein is shown in FIG. 2 as it is commonly employed in conjunction with a table extension plate 12.

In the embodiment shown, the rip fence assembly 13 consists of three pieces attached to each other, as by spot welding. Two rectangular bars 81—81 of a cross sectional shape designed to slide in the transverse channels 55—55 under the table 9, and to clear the notches 53 in the table, are formed with U shaped ends 82—82 and upstanding legs 83—83.

A thin metal angle bar 84 approximately the length of the box 2 is attached to the legs 83 and to the inside of the U 82 of the bars 81.

A table extension plate 12 is shown resting on the rip fence bars 81. This plate, which is of the same thickness as the table 9, and therefore is at the same level when resting as shown, has its four edges flanged. The end flanges 85—85 position the plate 12 longitudinally on the bars 81. Longitudinal flanges 80—80 at each side (FIGURES 2 and 4) are cut away at the ends to clear the bars 81 and serve to stiffen the plate 12.

The rip fence 13 may have its bars 81 inserted into the transverse channels 55 from either side of the table 9. When inserted from the blade side, the U-shaped ends of the bars 81 permit the upstanding leg of the angle 84 to approach very closely to the blade 4 (when the extension plate is not present). On this side the fence can be withdrawn from the blade as far as the length and rigidity of the bars 81 will permit. When inserted on this side of the table, the fence can be adjusted at from zero inches to say 9 or 10 inches from the blade. When inserted on the other side of the table, the fence can approach up to 9 inches of the blade and be set as far as 20 inches therefrom. These dimensions apply to a table on the order of 12 inches wide. The fence can be locked in position by tightening thumb screws 56—56 at the front and rear.

When it is not necessary to use as a rip fence, 13 can be fully withdrawn from the work table, inverted, and reinserted with the fence angle leg down. The legs 81 are then not inserted past the closer edge of the slot 6 in the work table so as not to interfere with the use of the slider-protractor assembly 7, 8. The extension plate 12 can then be rested on the bars 81 to provide additional support for materials being cut.

Motor assembly

The motor 3 is preferably housed within light weight metal castings and formed in one assembly with a gear reduction which drives a spindle or shaft 14. The shaft end is designed to mount a circular blade, abrasive disc, milling cutter, dado head and other tools which can be driven by the rotating shaft and which project therefrom above the work table 9. Since the assembly of the storage box, cover and work table is preferably formed of light weight sheet metal which is relatively flexible, problems arise in providing a rigid and accurate assembly of the blade supporting shaft 14 with the work guiding slot 6 and work supporting table 9.

FIGS. 3 and 4 illustrate how the inherent rigidity of the motor casting assembly 3 is transferred to the storage box 2 and interacts therewith by a three point suspension or connection system. This system also permits simple and accurate adjustment of the plane of the blade for parallelism with the guiding slot 6 and angularity with the work table surface 9.

The three significant members attaching the motor to the box include one screw 86 in the bottom of the motor 3 and box 2 and two bolts and nuts 88—88 through the end of the motor and the longitudinal box wall 23, near its corner with the bottom 21 of the storage box 2. Bolts and nuts 89—89 which attach the motor to the long box wall 23 at its upper edge do not have any positioning value as the upper edge of the box wall is easily flexed. However, these bolts do tie together the otherwise loose ends of the wall 23 which has been cut out to permit the motor castings and shaft 14 to project therethrough.

By placing the bolts 88—88 near the bend of the box bottom, the rigidity of the box at that point is communicated through the motor to maintain the blade on the shaft parallel to the slot 6.

Additionally, by passing the screw 86 through a clearance hole in the box bottom into a tapped hole in the motor casing and securing the box bottom therewith by means of the lock nut 87, the rigidity of the motor casing is transferred to the box to maintain the angle of the wall 23 with the bottom 21 at 90° and to maintain the plane of the blade 4 at the desired angle with the work table 9.

Four rubber feet 90, attached to the box bottom 21 near the corners thereof, serve to prevent the box from slipping while material is being cut, and to provide a clearance space for the head of the screw 86.

To adjust the angle of the plane of the blade with the cover and work table it is merely necessary to loosen the lock nut 87, turn the screw 86 in or out as required, and then retighten the nut. To adjust the parallelism of the blade with the slot 6 shim washers may be placed between the walls of the motor casing and the box wall 23 over either of the bolts 88—88 as may be required.

It should be understood that numerous modifications may be made of the specific and preferred embodiment above described without deviating from the broader aspects of the invention.

What is claimed is:

1. A motor driven tool assembly comprising a storage box having a substantially rectangular open top box-like body, a motor secured within said box having a power take off shaft positioned below and parallel to a substantially flat cover set over said storage box, said shaft being parallel to a wall of said box on which said cover is pivotably secured, means, in addition to said securing pivot, spaced from said pivot's center line, comprising a pair of arcuately slotted plates affixed to one of said cover or walls of said box which are at right angles to said shaft and adjustably secured to the other to align the cover with last said walls, restrain it from motion parallel to said shaft and vary the distance between cover and shaft so that, when a cutting tool is mounted on said shaft, a work piece is supported on said cover and the tool and work piece are brought together, a variable depth of cut may be effected on the work piece.

2. A motor driven tool assembly comprising a storage box having an open top box-like body; a motor secured within said box having a power take off shaft positioned below and parallel to a substantially flat cover set over said storage box, said cover being movable to uncover the open portion of the box while remaining parallel to said shaft; means for adjustably securing said cover in positions of varying distance from said shaft; a flat work piece supporting table situated above said cover and pivotably secured thereto along a pivot line at one edge thereof which is parallel to a plane at right angles to said shaft; means for adjustably securing said table in positions of varying inclination with respect to said cover; and a tool connected to the motor's power take off shaft near the pivot line of said work table with at least a portion thereof extending above said table.

3. A motor driven tool assembly comprising a storage box having an open top box-like body; a motor secured within said box having a power take off shaft positioned below and parallel to a substantially flat cover set over said storage box, said cover being movable to uncover the open portion of the box while remaining parallel to said shaft; means for adjustably securing said cover in positions of varying distance from said shaft; a flat work piece supporting table situated above said cover and pivotably secured thereto along a pivot line at one edge thereof which is parallel to a plane at right angles to said shaft; means for adjustably securing said table in positions of varying inclination with respect to said cover; a tool connected to the motor's power take off shaft near the pivot line of said work table with at least a portion thereof extending above said table; and means for guiding one, of a work piece and said motor, in movement parallel to said pivot line, toward the other to bring the work and the tool together.

4. In a motor driven tool assembly of the class described; a substantially rectangularly shaped motor enclosing storage box having four enclosing wall surfaces of which two form spaced apart longitudinal parallel sides and two form spaced apart transverse parallel ends; in which a fifth enclosing surface, spanning said walls, is secured pivotably to said assembly by a hinge whose pin is centered near common edges of and parallel to said fifth surface and one said end, and perpendicular to said side surfaces; and in which a sixth surface, serving as a work table, is secured pivotably to said motor driven tool assembly by means of a hinge whose pin is located in a plane near and parallel to one said side; a motor within said box having a power take off shaft placed parallel to the first said hinge and below the second said hinge; a tool receiving arbor mounted on said shaft, and a tool supported thereby with at least a portion thereof extending above said work table at a point adjacent to the second said hinge pin; means for adjustably securing the first said hinge to place said sixth surface in positions of varying distance from said shaft and the second said hinge to place said sixth surface in positions of varying inclination to said shaft.

5. In a motor driven tool assembly, a substantially rectangular, motor enclosing, box frame having two opposed, substantially rectangular and planar longitudinal sides and two similar, spaced apart, transverse, side connecting ends; a fifth rectangularly framed, box spanning and enclosing surface, perpendicular to said sides, hinged to said box frame with a hinge having its pin placed parallel to said transverse ends and perpendicular to said sides; a sixth, top spanning, surface, serving as a work table, hinged to said assembly with a second hinge having its pin placed near and parallel to one of said sides; a motor within said frame having a power take off shaft placed parallel to the first said hinge pin and below the second hinge pin, a tool receiving arbor mounted on said shaft with a tool supported thereby having at least a portion thereof extending above said sixth surface at a point adjacent to the second hinge pin, said motor being attached to at least one of said enclosing surfaces so as to allow the distance between the second hinge pin and the power take off shaft to be varied as the fifth said surface is pivoted on the first said hinge pin, and to allow the angle between the sixth surface and the shaft to be varied as said sixth surface is pivoted on the second hinge pin.

6. In a motor driven tool of the class described; a substantially rectangularly shaped motor enclosing box having two opposed, substantially rectangular and planar, longitudinal sides, and two similar, spaced apart, transverse, side connecting ends; a substantially rectangularly framed surface, serving as a cover and work table, secured pivotably to one of said ends, the pivot center line being positioned near a common edge of and parallel to said end and last surface; a motor within said box having a power take off shaft placed parallel to said pivot center line; a tool receiving arbor mounted on said shaft, and a tool supported thereby, with at least a portion thereof extending above said cover, and means, in addition to said securing pivot, spaced from said pivot's center line, affixed to one of said cover or side and coacting with the other, aligning said cover and sides, for adjustably securing the cover in positions of varying distance from and restraining it from motion parallel to the shaft, so that, when a work piece is supported on said cover and the tool and work piece are brought together, a variable depth of cut may be effected upon the work piece.

References Cited in the file of this patent
UNITED STATES PATENTS

| | | |
|---|---|---|
| 615,833 | Fisher | Dec. 13, 1898 |
| 707,675 | Colburn | Aug. 26, 1902 |
| 1,380,707 | Fehrm | June 7, 1921 |
| 1,387,869 | Royle | Aug. 6, 1921 |
| 1,669,941 | Kennedy | May 15, 1928 |
| 1,786,192 | Cullman | Dec. 23, 1930 |
| 1,864,840 | Lehner | June 28, 1932 |
| 1,938,549 | Tautz | Dec. 5, 1933 |
| 2,076,015 | Broome | Apr. 6, 1937 |
| 2,212,401 | Morrill et al. | Aug. 20, 1940 |
| 2,759,507 | Davis et al. | Aug. 21, 1956 |
| 2,767,747 | Burrows | Oct. 23, 1956 |